(12) United States Patent
Gallistel

(10) Patent No.: US 11,808,333 B1
(45) Date of Patent: Nov. 7, 2023

(54) HETERODYNE TRANSMISSION

(71) Applicant: Anthony A. Gallistel, Omaha, NE (US)

(72) Inventor: Anthony A. Gallistel, Omaha, NE (US)

(*) Notice: Subject to any disclaimer, the term of this patent is extended or adjusted under 35 U.S.C. 154(b) by 0 days.

(21) Appl. No.: 18/303,224

(22) Filed: Apr. 19, 2023

Related U.S. Application Data

(60) Provisional application No. 63/332,767, filed on Apr. 20, 2022.

(51) Int. Cl.
*F16H 37/02* (2006.01)
*F16H 57/00* (2012.01)

(52) U.S. Cl.
CPC .......... *F16H 37/02* (2013.01); *F16H 57/0006* (2013.01)

(58) Field of Classification Search
CPC ........ F16H 37/02; F16H 57/0006; F16H 1/32; F16H 2001/323
See application file for complete search history.

(56) References Cited

U.S. PATENT DOCUMENTS

| | | | |
|---|---|---|---|
| 4,014,224 A | 3/1977 | Pitts | |
| 4,070,855 A | 1/1978 | Lund | |
| 4,121,472 A | 10/1978 | Vural et al. | |
| 4,621,543 A * | 11/1986 | Gabilondo | F16H 1/46 475/168 |
| 8,307,652 B1 * | 11/2012 | Gallistel | F03G 7/10 475/255 |
| 2002/0104392 A1 * | 8/2002 | Murray | F03G 3/00 74/84 S |
| 2005/0054470 A1 * | 3/2005 | Choun | F16H 1/32 475/181 |
| 2006/0197487 A1 | 9/2006 | Manfredotti et al. | |
| 2016/0195071 A1 | 7/2016 | Pellegrin | |
| 2020/0124159 A1 | 4/2020 | Weiss | |

* cited by examiner

*Primary Examiner* — Edwin A Young
(74) *Attorney, Agent, or Firm* — Nasr Patent Law LLC; Faisal K. Abou-Nasr

(57) ABSTRACT

A rotary machine employing a heterodyne transmission includes: a central axle; a planetary gear set comprising a sun gear journaling the central axle and a plurality of planet gears surrounding and intermeshed with the sun gear; and a plurality of rotating clusters, each of the rotating clusters comprising a rotating central body and a plurality of rotating eccentric bodies surrounding and intermeshed with the rotating central body, wherein the rotating central body is coupled to a respective one of the planet gears, and wherein each of the rotating eccentric bodies has a center of mass off-axis with respect to its axis of rotation.

20 Claims, 16 Drawing Sheets

SECTION A-A

HETERODYNE TRANSMISSION

CROSS-REFERENCE TO RELATED APPLICATIONS

The present application claims priority under 35 U.S.C. § 119(e) to U.S. Provisional Application Ser. No. 63/332,767, filed Apr. 20, 2022, and titled "HETERODYNE TRANSMISSION," which is incorporated herein by reference in its entirety.

TECHNICAL FIELD

The present invention generally relates to rotary machines for transmitting and/or generating power.

BACKGROUND

While motors and transmission systems have become much more efficient over time, there continues to be a great need for improvements. In U.S. Pat. No. 8,307,652, the inventor disclosed a heterodyne transmission embodied by machinery for generating unbalanced conditions, and adjusting the degree of imbalance, so the machinery is responsive either to variation in either load or rotational velocity. The present disclosure provides improvements on the previously disclosed heterodyne transmission machinery and concepts. To the extent that it serves to explain principles underlying the present disclosure, U.S. Pat. No. 8,307,652 is incorporated herein by reference in its entirety.

SUMMARY

Various embodiments are presented in this disclosure of a rotary machine employing a heterodyne transmission. The rotatory machine generally comprises: a central axle; a planetary gear set comprising a sun gear journaling the central axle and a plurality of planet gears surrounding and intermeshed with the sun gear; and a plurality of rotating clusters. Each of the rotating clusters comprises a rotating central body and a plurality of rotating eccentric bodies surrounding and intermeshed with the rotating central body, wherein the rotating central body is coupled to a respective one of the planet gears, and wherein each of the rotating eccentric bodies has a center of mass off-axis with respect to its axis of rotation.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The Detailed Description is provided with reference to the accompanying figures. The use of the same reference numbers in different instances in the description and the figures may indicate similar or identical items. Various embodiments or examples of the present disclosure are provided in the following detailed description and the accompanying drawings. The drawings are not necessarily to scale. Furthermore, operations of disclosed processes may be performed in an arbitrary order, unless otherwise indicated in the detailed description or in the claims.

DETAILED DESCRIPTION

Figure 1:
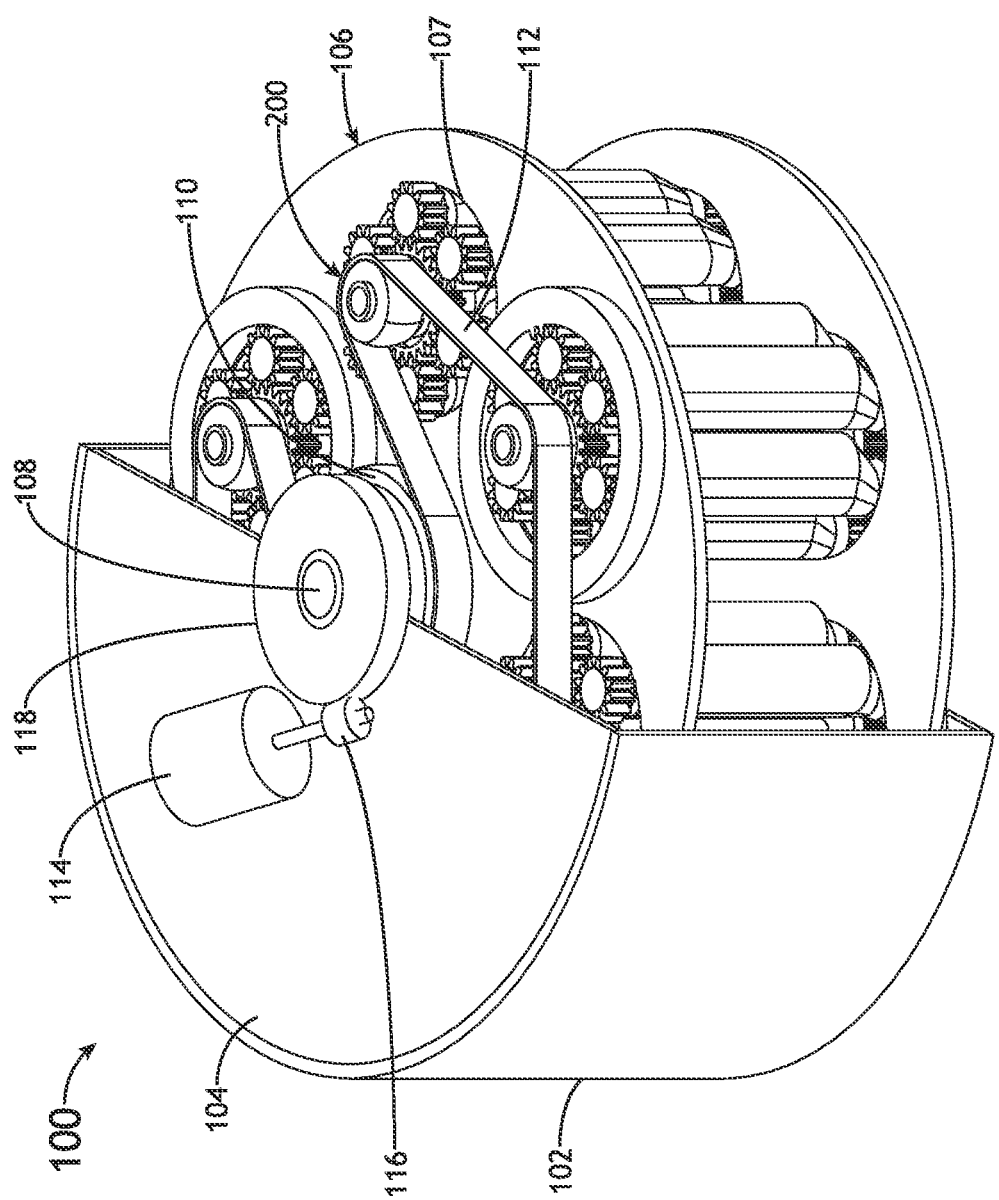
FIG. 1 is a perspective view of a heterodyne transmission with a throttling mechanism, wherein a portion of the outer casing is not shown, in accordance with one or more embodiments of this disclosure.
Figure 2:
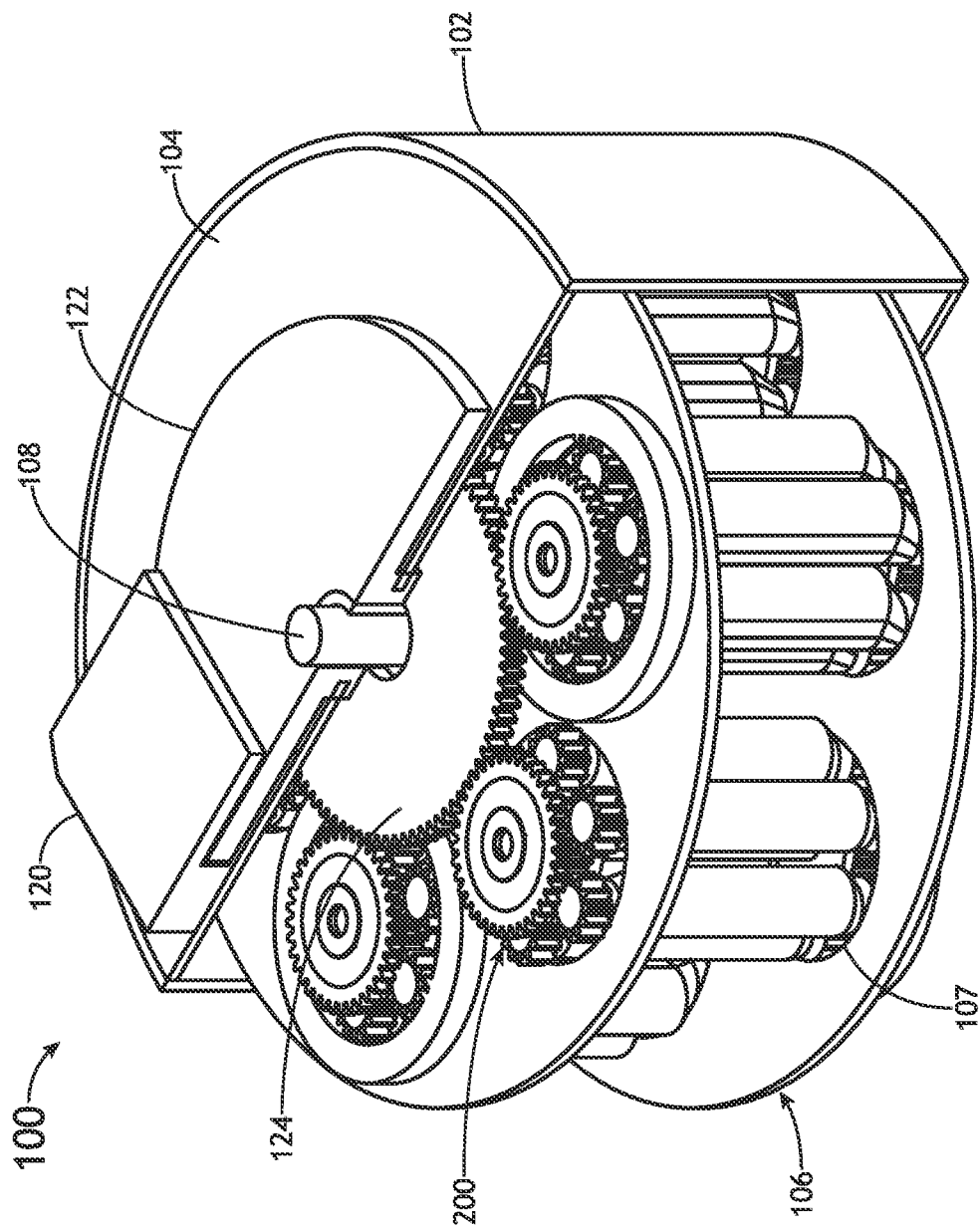
FIG. 2 is a perspective view of a heterodyne transmission with a braking mechanism, wherein a portion of the outer casing is not shown, in accordance with one or more embodiments of this disclosure.

Reference will now be made in detail to the subject matter disclosed, which is illustrated in the accompanying drawings. FIGS. 1 through 16B illustrate various embodiments of a rotary machine 100 that employs a heterodyne transmission. For example, FIGS. 1 and 2 illustrate embodiments of the rotary machine 100 with a throttling mechanism in FIG. 1 and a braking mechanism in FIG. 2. Several additional embodiments are illustrated throughout the drawings and described below. Those skilled in the art will appreciate that the embodiments illustrated in FIGS. 1 through 16B are specific examples that can be modified by changing dimensions, rearranging components, adding/removing non-essential components or fillers, and/or replacing components with functional equivalents. Furthermore, two or more embodiments (or portions thereof) can be combined to achieve an additional embodiment that is not necessarily shown or described with reference to one drawing. As such, the drawings should not be construed as restrictive of any particular embodiment and are intended instead as visual aids to help describe configurations of certain components that may apply to multiple embodiments of the rotary machine 100.

The rotatory machine 100 is typically contained within an outer casing 102 that includes or is attached to a pair of end plates 104. In embodiments, the rotary machine 100 includes a central axle 108 with a planetary gear set orbiting the central axle 108. The planetary gear set includes a sun gear 110 journaling the central axle 108 and a plurality of planet gears 208 surrounding and intermeshed with the sun gear 110. Each of the planet gears 208 is coupled to a rotating cluster 200 of eccentric bodies (sometimes referred to herein as "eccentrics"). The rotary machine 100 includes a plurality of rotating clusters 200 spaced uniformly about the periphery of a rotor assembly 106 that rotates about a central axle 108.

Figure 3:
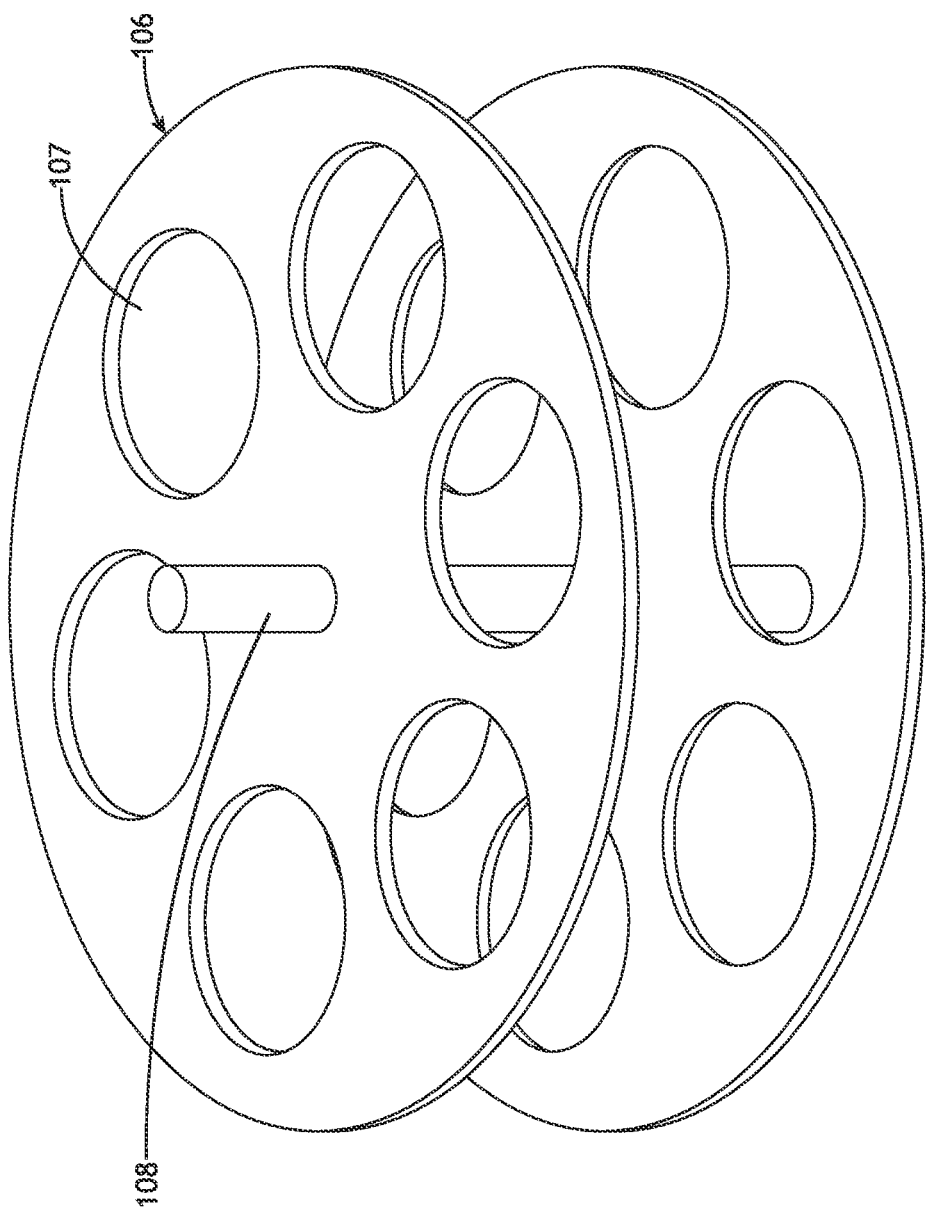
FIG. 3 is a perspective view of a rotor assembly, in accordance with one or more embodiments of this disclosure.

In embodiments, the rotor assembly 106 includes a set of circular plates (preferably two) connected by the central axle 108. Each of the circular plates includes a plurality of circular openings 107 for respective ones of the plurality of rotating clusters 200 to rotate within. An example embodiment of the rotor assembly 106 is shown in FIG. 3.

Figure 4:
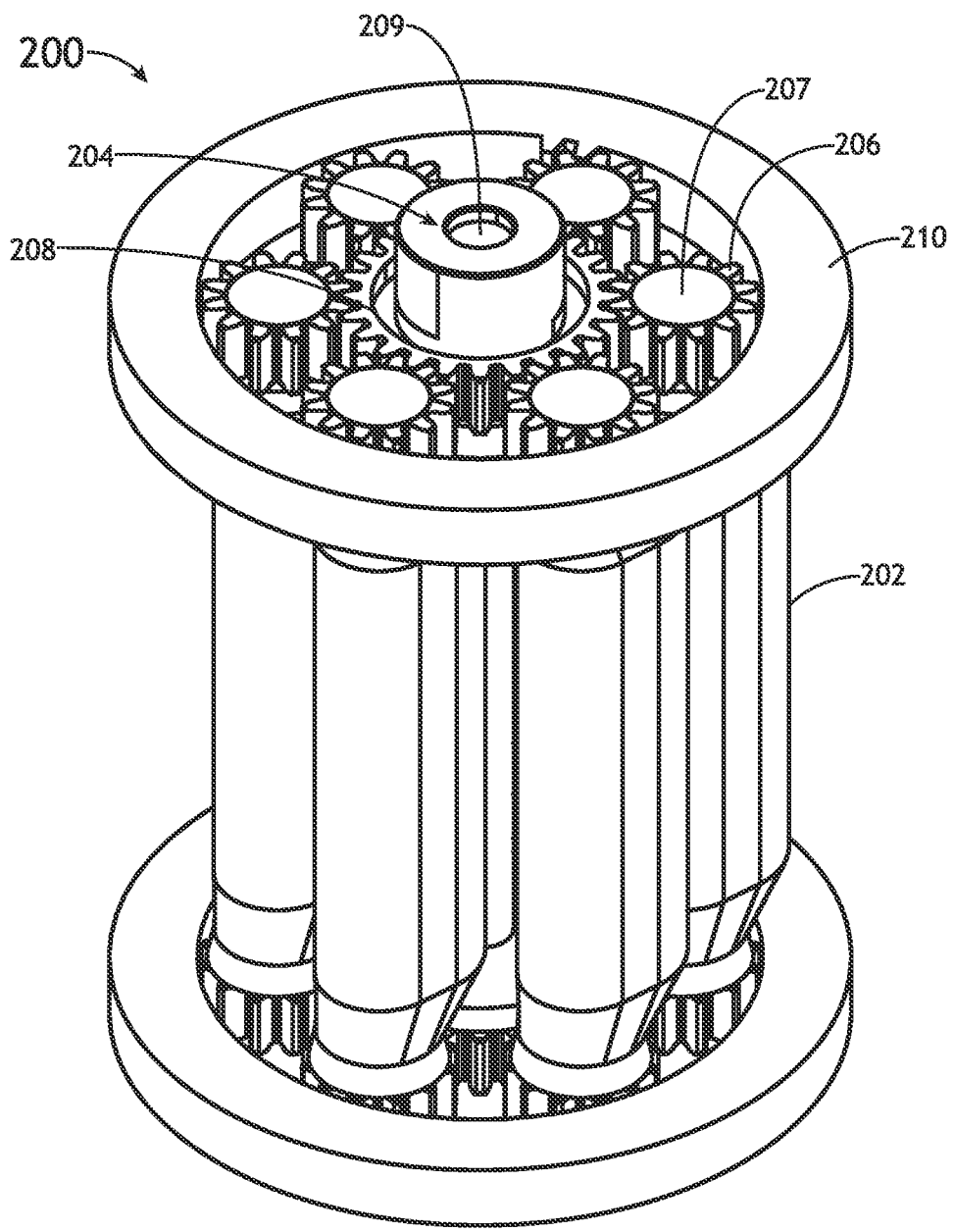
FIG. 4 is a perspective view of a rotating cluster of eccentric bodies, in accordance with one or more embodiments of this disclosure.
Figure 8B:
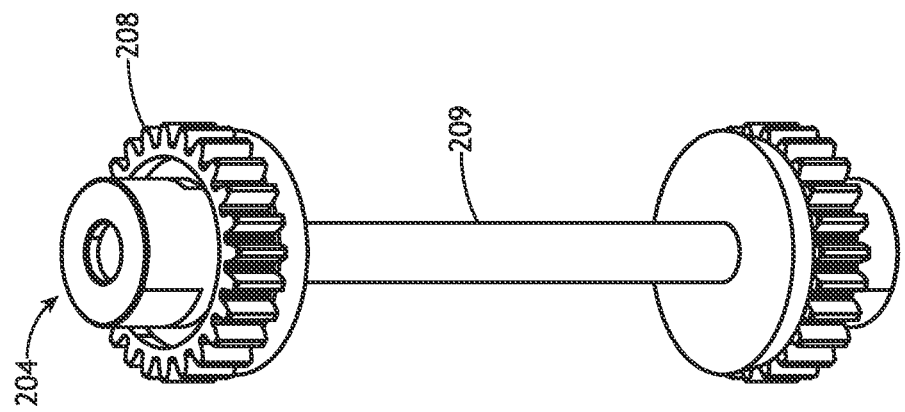
FIG. 8B is a perspective view of a rotating central body from a rotating cluster of eccentric bodies, in accordance with one or more embodiments of this disclosure.
Figure 8A:
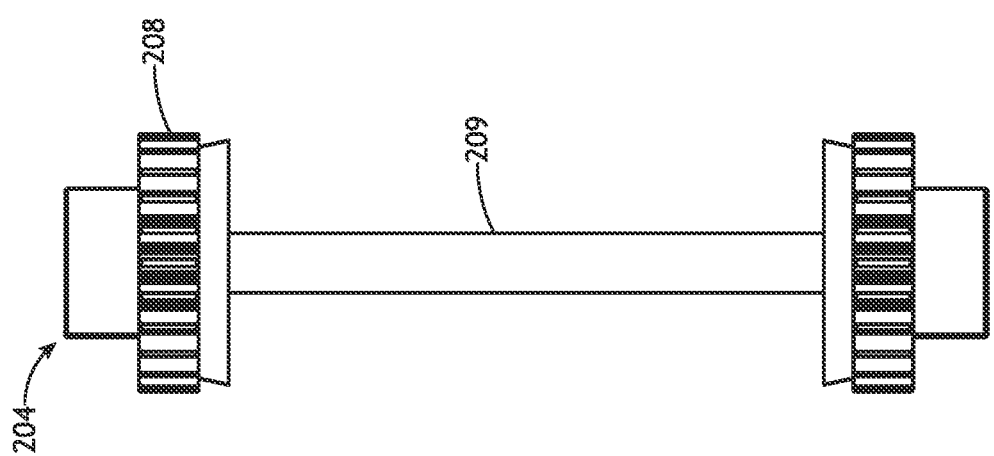
FIG. 8A is a side view of a rotating central body from a rotating cluster of eccentric bodies, in accordance with one or more embodiments of this disclosure.

As shown in FIG. 4, each of the rotating clusters 200 includes a rotating central body 204 and a plurality of rotating eccentric bodies 202 surrounding and intermeshed with the rotating central body 204. In embodiments, the rotating central body 204 is coupled to a respective one of the planet gears 208. For example, FIGS. 8A and 8B show example embodiments of the rotating central body 204 having a central axle 209 and gears 208 at either end. In some embodiments, the rotating central body 204 may have rollers (e.g., capstan rollers) instead of or in addition to one or more gears 208. The gearing 208 of the central body may comprise any of the following, or a combination thereof: spur type gears; helically pitched gears; or capstan rollers having a cylindrical, barrel shaped, tapered cylinder, or conical exterior surface.

Figure 7B:
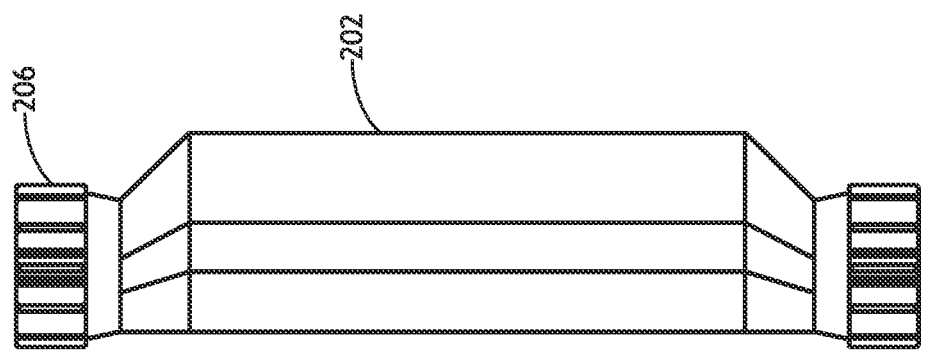
FIG. 7B is a side view of a rotating eccentric body from a rotating cluster of eccentric bodies, in accordance with one or more embodiments of this disclosure.
Figure 7A:
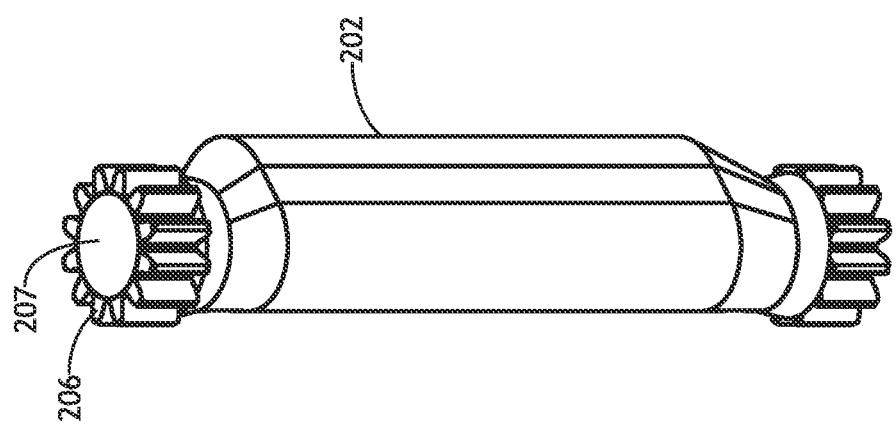
FIG. 7A is a perspective view of a rotating eccentric body from a rotating cluster of eccentric bodies, in accordance with one or more embodiments of this disclosure.

As shown in FIGS. 7A and 7B, each of the rotating eccentric bodies 202 has a center of mass off-axis with respect to its axis of rotation, which is defined by an axle 207 that extends through the eccentric body 202. In a specific embodiment, the eccentric body 202 has a cylindrical or substantially cylindrical (e.g., barrel shaped) contour with the axle 207 extending longitudinally through the eccentric body 202 off-center. Each of the eccentric bodies 202 may also have gears and/or rollers 206 at either end intermeshing with gears/rollers 208 at either end of the central body 204. The gearing of the gearing 206 may comprise any of the following, or a combination thereof: spur type gears; helically pitched gears; or capstan rollers having a cylindrical, barrel shaped, tapered cylinder, or conical exterior surface.

Figure 5A:
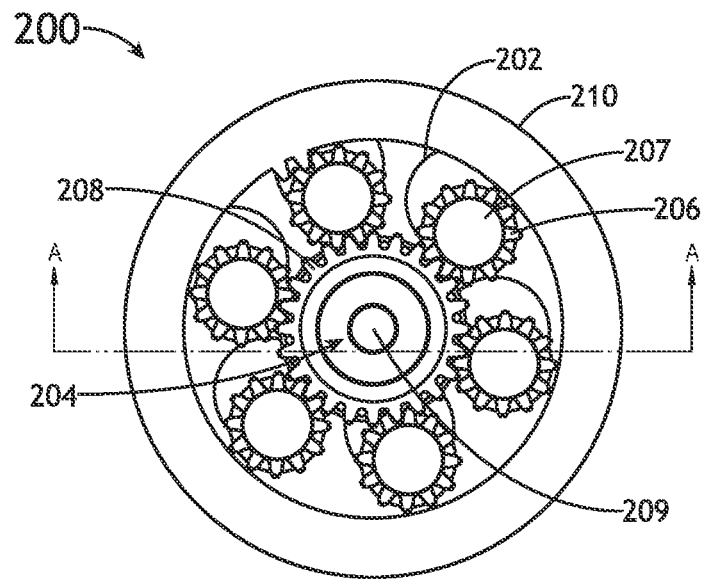
FIG. 5A is a top view of a rotating cluster of eccentric bodies, in accordance with one or more embodiments of this disclosure.
Figure 5B:
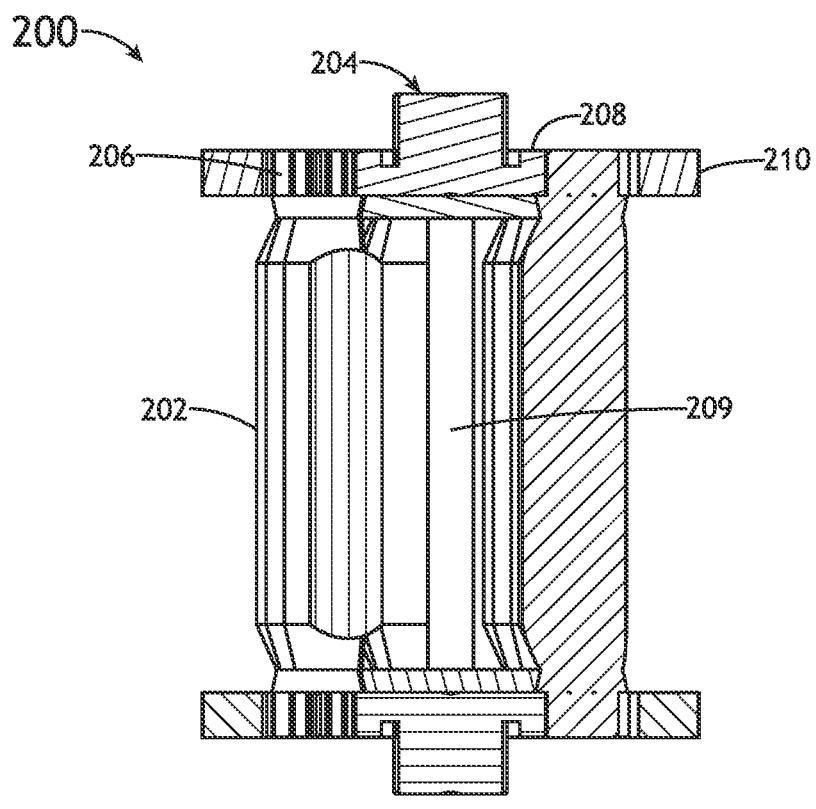
FIG. 5B is a cross-sectional side view of the rotating cluster of eccentric bodies illustrated in FIG. 5A, in accordance with one or more embodiments of this disclosure.
Figure 6:
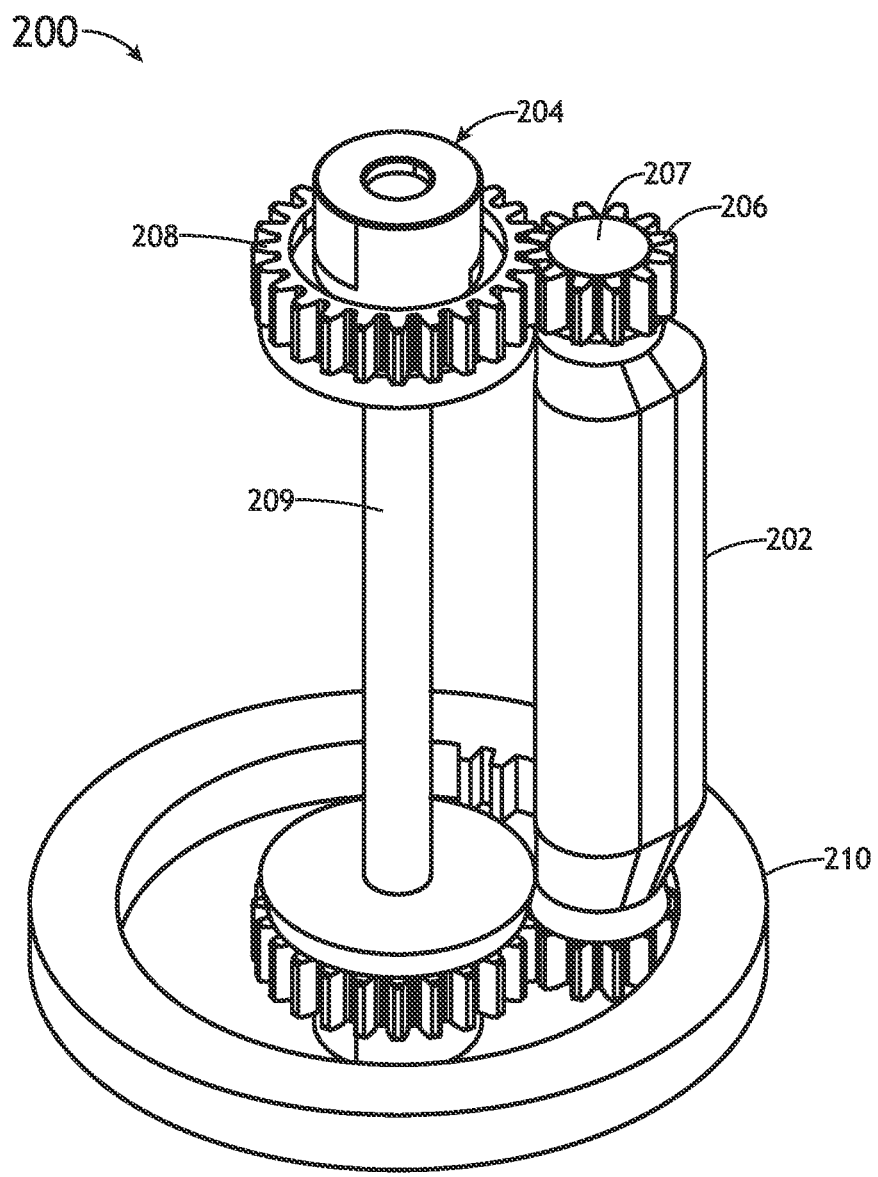
FIG. 6 is a perspective view of a rotating eccentric body orbiting a rotating central body from a rotating cluster of eccentric bodies, in accordance with one or more embodiments of this disclosure.

FIGS. 5A and 5B show top and cross-sectional views of a rotating cluster 200 of eccentric bodies 202, and for further illustration, FIG. 6 shows one eccentric body 202 in relation to the central body 204.

Each rotating cluster 200 of eccentric bodies 202 is bound by one or more (preferably two) cluster rings 210. For example, FIG. 4 illustrates cluster rings 210 at either end of the rotating cluster 200. In some embodiments, the cluster ring 200 comprises a ring gear 210 intermeshed with gearing (e.g., gears/rollers 206) of the eccentric bodies. The ring gear may be toothed in this regard. Alternatively, the cluster ring 210 may comprise a smooth ring. In this case, each of the rotating eccentric bodies 202 may have a rotary axle 207 that is coupled to a capstan roller, or a ring embedded with roller bearings or bushings.

The eccentrics 202, in any given cluster 200, are typically arranged in a planetary configuration supported by eccentric rollers 206 as bearing means and regulated in the orientation of their eccentricity by gearing, for example, a gear engaging each eccentric gear and mutually engaging sun gear (gear 208) that is central to each cluster 200. Thus, typically both the bearing and gearing means of any given group of eccentrics have a planetary configuration. The orientation of the group is determined by the combined action of the gearing encompassing the group which is typically rigidly mounted or integrally made part of the rotor assembly 106 and the ratable motion of the sun gear 110, as these are ratably controlled by the action of a throttling gear train. The throttling gear train connects a throttle gear 118 (e.g., worm wheel), which is driven by an actuator 114 (e.g., via worm gear 116), to the sun gear 110 which is configured to turn about the central axle 108 of the machine. An example embodiment of the throttling gear train is illustrated in FIG. 1, though many other types of conventional throttling systems may be utilized in a similar fashion.

During rotary operation, a centrifugal force is generated acting upon the center of mass of the eccentric bodies 202 in their several clusters 200 positioned equidistant about the periphery of the central rotor 106 of the machine 100. If the orientation of the eccentricity of these bodies is synchronized and regulated with respect to this centrifugal force a net unbalanced torque moment is transmitted to the sun gear 208 of that cluster 200, which is also planet gear relative to the sun gear 110 of the greater system, and this torque moment is transmitted by mesh engagement to another external device, for example, to a throttling mechanism that drives another machine. The gear ratios being chosen so that any ratable motions of throttling gear group are minimal as compared to the rotations of the central axle 108.

Due to this differential in rotary rates, the power consumed or produced by the central throttling group is minimal compared to the power produced or consumed at the central axle 108. This torque differential is herein referred to as a heterodyne effect.

As the general form of the gearing and bearing means herein disclosed work in coordination to continuously maintain the orientation of the several eccentrics 202 in the several clusters 200 and this orientation may either lead or lag the center of any given cluster 200, the net torque moment present at the central axle, the output shaft of the machine, can be determined by action of the externally controlled throttling means to be either motoring or braking in its net effect.

Similarly, if the vector representing the orientation of the eccentricity an eccentric group (i.e., a cluster 200) is aligned with the radius of the central rotor 106 passing though the center of said group the degree of heterodyne effect is minimal. Whereas if this eccentric vector is continuously maintained by the throttling means to be substantially perpendicular to the radial vector passing the center of the group, then the net heterodyne effect is maximal. Thus provided the rotor 106 is rotating, the externally controlled throttling means can determine the type of heterodyne effect, either motoring or braking, and influence the strength of that effect.

In previous designs of heterodyne transmissions, these torques were individually transmitted to the central throttling gear of the orbital bodies present in that means. At high speeds and powers these central orbital throttling gear tended to fail, either braking, or more typically melting. The herein disclosed heterodyne transmissions eliminate orbital bodies, replacing their function with orbital clusters 200 arranged in a planetary configuration. This significantly reduces the total component count and distributes the torque load between at least a sun and ring gear. The art herein disclosed also includes bearing means for the eccentrics 202, in any given cluster 200 similarly arranged in a planetary configuration. The capstan type mesh engagement of this bearing means further supports the ratable control of the eccentrics 202.

A wide variety of throttling means such as are common knowledge to those skilled in the art of mechanical design, such as cam and cable, gear motors, worm and wheel, electromagnetic motors or brakes can regulate the orientation of the eccentrics, typically these means act on the several eccentrics through the throttling gear train, via the central throttling gear 110 (sometimes referred to herein as "sun gear 110"). However, several other means of full or partial throttling engagement are possible. For example, a starter motor and projecting and retracting starter type gear might ratably engage the periphery of a rotor end plate, or electromagnetic force emanating from poles or windings affixed to the encompassing housing 102 may interact with the eccentric bodies 202 assuming these bodies 202 have magnetic, ferromagnetic, or electromagnetic properties.

Because the gearing ratio of the central throttling gear 110 is dependent on the diametral pitch chosen for every element of the entire gear train, the relative motion of the central gear 110 can be chosen by design. If these are chosen so that the central gear need not rotate at all in order to maintain a certain fixed heterodyne effect, either motoring or braking then it is possible, though seldom desirable for the ratable motion of the central throttling gear 110, to be pinned to the housing 102, or set by a simple lever. The heterodyne effect however will remain dynamic because it primarily depends on the amount of centrifugal force which varies with the central rotor's rate of rotation. It is this dynamism of heterodyne effect that makes the choice of a fixed degree of throttling problematic. If the load on the transmission should fail the machine may overspeed and fail catastrophically.

Similarly, it is possible to design the throttling gear train ratios such that a slow motoring of the central throttling gear 110 produces either a neutral central rotor output or a heterodyne effect. As any throttle may stick, or any brake may fail, great care should be taken in the design of throttle control means so that systemic dynamic failures resolve safely. Similarly, where possible, it is preferable that the encompassing housing of the machine be of sufficient strength that it can contain the dynamic effect of any turbine overspeed failure.

Another throttling means splits the heterodyne effect between a first throttling gear train and a second throttling gear train. The pair of throttling gear trains typically outputting counter rotating tongues. The output torques may be output at either end of the main rotor 106, wherein the central axle comprises nested counter rotating axles at either end of said housing 102. In the more typical single output shaft configuration, the second throttling gear train terminates at an externally controlled, nearly stationary, externally controlled motoring or braking means as previously stated.

As a safety note, the rotating clusters 200 of eccentric bodies 202 should be restrained by rotor locking means, and rotor assemblies should not be placed on a floor or table like a wheel. All assembly, test, inspection and analysis should be made with the rotor axle vertically orientated.

Specific Embodiment: Motoring

Referring now to FIG. 1, a preferred embodiment of the rotary machine 100 is substantially comprised of: a housing assembly typically made of a housing casing 102 and a pair of housing ends 104, said housing ends having central axle 108 bearing at one axial end and a throttle gear bearing at the other axial end, said throttle gear bearing journaling a tubular shaft portion of a throttle gear 118, said throttle gear 118 further encompassing the central axle bearing and journaling the central axle 108 of the rotor assembly 106, said rotor assembly 106 also having one or more (preferably two) end plates with circular openings 107 distributed evenly about said end plates, wherein clusters 200 of eccentric bodies 202 are configured to rotate within respective ones of the circular openings in each plate such that said clusters 200 are equally distributed near the periphery of said end plates, said clusters 200 being comprised of one or more (preferably two) cluster rings 210 (e.g., a bearing race, a smooth ring, or a gear toothed ring), in capstan mesh with rollers 206 on one or both ends of the eccentric bodies 202, each of said eccentric bodies 202 being further comprised of one or more eccentric gears in place of or in addition to rollers 206, said eccentric gear and/or roller 206 being in mesh engagement with central body 204 (sometimes referred to herein as a "solar body"), said solar body 204 having a sun gear 208 in mesh with said eccentric gear 206, and optionally a sun roller in mesh with said eccentric roller further meshing with an eccentric body throttle gear, said eccentric body throttle gear of said solar body meshing with a throttle gear train comprised of a throttle gear (i.e., the sun gear 110) ratably coupled to the central axle 108 by a throttle gear bearing and driven by a throttle worm wheel 118, which is driven by a throttling worm 116 that is regulated by an externally controlled throttling motor 114.

Specific Embodiment: Braking

Referring now to FIG. 2, another preferred embodiment of the rotary machine 100 is substantially comprised of: a housing assembly typically made of a housing casing 102 and a pair of housing ends 104, said housing ends having central axle 108 bearing at one axial end and a throttle gear bearing at the other axial end, said throttle gear bearing journaling a tubular shaft portion of a throttle gear 124, said throttle gear 118 further encompassing the central axle bearing and journaling the central axle 108 of the rotor assembly 106, said rotor assembly 106 also having one or more (preferably two) end plates with circular openings 107 distributed evenly about said end plates, wherein clusters 200 of eccentric bodies 202 are configured to rotate within respective ones of the circular openings in each plate such that said clusters 200 are equally distributed near the periphery of said end plates, said clusters 200 being comprised of one or more (preferably two) cluster rings 210 (e.g., a bearing race, a smooth ring, or a gear toothed ring), in capstan mesh with rollers 206 on one or both ends of the eccentric bodies 202, each of said eccentric bodies 202 being further comprised of one or more eccentric gears in place of or in addition to rollers 206, said eccentric gear and/or roller 206 being in mesh engagement with central body 204 (sometimes referred to herein as a "solar body"), said solar body 204 having a sun gear 208 in mesh with said eccentric gear 206, and optionally a sun roller in mesh with said eccentric roller further meshing with an eccentric body throttle gear, said eccentric body throttle gear of said solar body meshing with a throttle gear train comprised of a throttle gear (i.e., the sun gear 124); said throttle gear 124 being connected to a throttling brake disk 122 that can be braked by a throttling brake caliper 120 which is externally controlled.

Specific Embodiment: Serpentine Belt

FIG. 2 provides an example of toothed gears meshing to drive the planetary gearset of the greater system; however, in other embodiments, the solar and planetary bodies may be driven by a pulley system as shown in FIG. 1. In this regard the sun gear 110 and central cluster gears 208 may be replaced by or attached to rollers that are intermeshed with a serpentine belt 112 that engages the sun roller and each of the central rollers of the clusters 200 so that the sun gear/roller 110 acts as an eccentric body throttle pulley, said eccentric body throttle pulley meshing with a throttle gear train comprised of the eccentric body throttle pulley (i.e., sun gear/roller 110) ratably coupled to the central axle 108 by a throttle gear bearing and driven by a throttle worm wheel 118, which is driven by a throttling worm 116 that is regulated by an externally controlled throttling motor 114.

Specific Embodiment: Counter Rotating, Dual Output Throttling

Figure 15B:
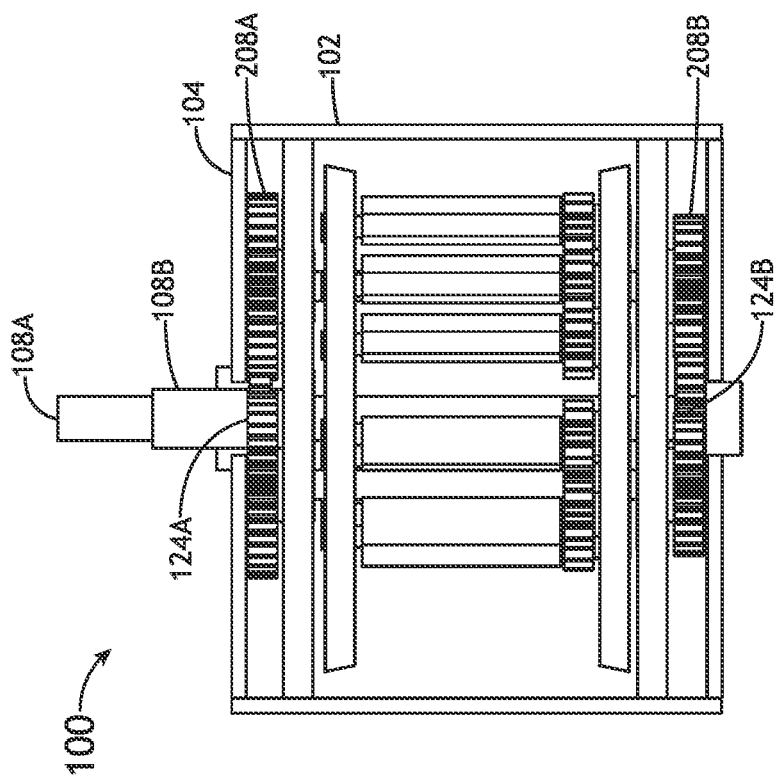
FIG. 15B is a side view of the heterodyne transmission illustrated in FIG. 15A, wherein a portion of the outer casing is not shown, in accordance with one or more embodiments of this disclosure.
Figure 15A:
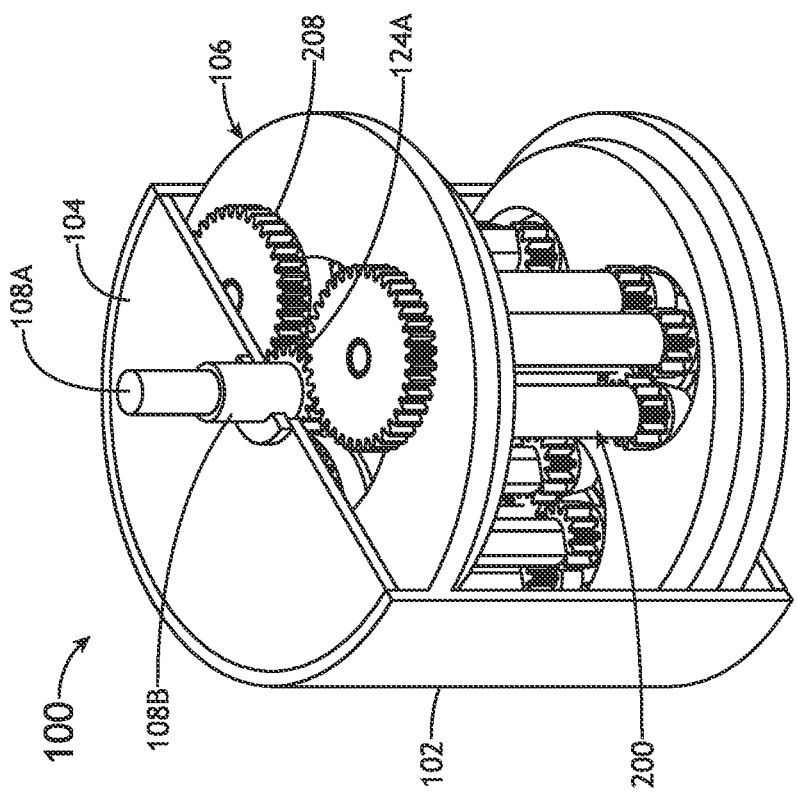
FIG. 15A is a perspective view of a heterodyne transmission with nested concentric axles that are configured to rotate in opposite directions, wherein a portion of the outer casing is not shown, in accordance with one or more embodiments of this disclosure.

Referring now to FIGS. 15A and 15B, any of the embodiments described herein may include a dual output throttling mechanism. For example, FIGS. 15A and 15B illustrate an embodiment of the rotary machine 100, wherein the central axle 108 comprises an inner shaft 108A nested within an outer shaft 108B. The inner shaft 108A and the outer shaft 108B are concentric and configured to turn in opposite directions (i.e., one rotating clockwise and the other counterclockwise). This counter rotation is effected by separate gearings 124A and 124B that drive the inner shaft 108A and outer shaft 108B, respectively; although the separate gearings 124A and 124B are both intermeshed with the rotating clusters 200 but configured to be driven in opposite directions as a result of their interactions with the planet gears 208 (including gears 208A and 208B on either end of each cluster 200).

Specific Embodiment: Electromagnetic Throttle

Figure 16B:
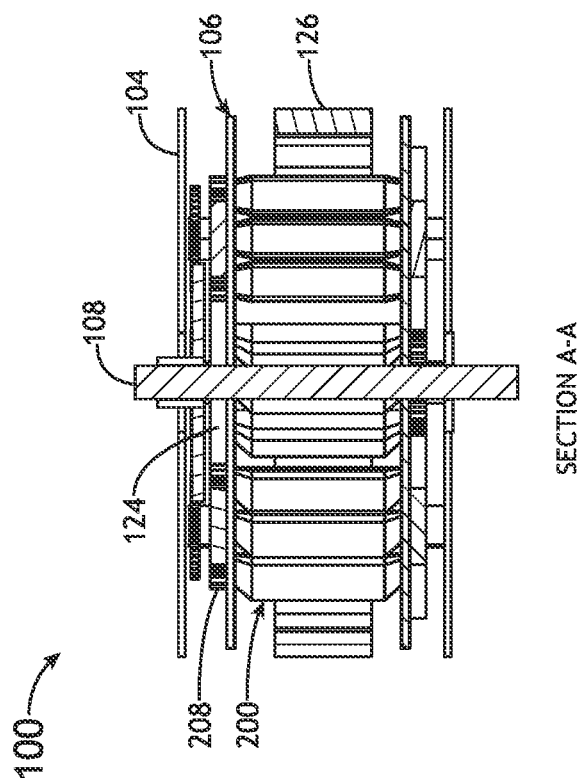
FIG. 16B is a side view of the heterodyne transmission illustrated in FIG. 16A, wherein a portion of the outer casing is not shown, in accordance with one or more embodiments of this disclosure.
Figure 16A:
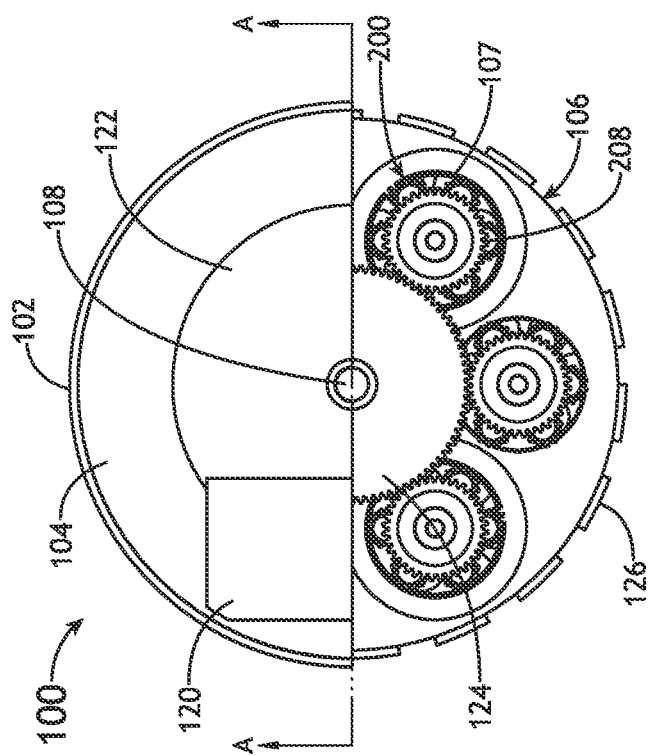
FIG. 16A is a top view of a heterodyne transmission with electromagnetic throttling field coils surrounding the rotor assembly and rotating clusters of eccentric bodies with magnetic properties, wherein a portion of the outer casing is not shown, in accordance with one or more embodiments of this disclosure.

Referring now to FIGS. 16A and 16B, any of the embodiments described herein may include an electromagnetic throttling mechanism. For example, FIGS. 16A and 16B illustrate the embodiment of FIG. 2 augmented by an electromagnetic throttling mechanism. In a preferred embodiment, the electromagnetic throttling mechanism comprises a set of field coils 126 that surround the rotor 106 and interact with magnetic components or magnetized portions of the eccentric bodies 202, said field coils 126 being typically made of ferromagnetic material encompassed by coils of electrically conductive material having an electric current externally controlled to create a magnetic field, said magnetic field interacting with magnetic components or magnetized portions of the eccentric bodies 202 via an electromagnetic force.

In this electromagnetic externally controlled throttling system if said eccentric bodies have a permanent, induced, or conductively charged magnetic property they will tend to create a back electromagnetic force and thus induce a current in said field coils. This induced current may be used as an indicator of the dynamic state of the machine, or for any other useful purpose.

Specific Embodiment: Toothed Gears

In some embodiments, the gearing of the rotating clusters 200 of eccentric bodies 202 (e.g., gears 206 and 208) and/or throttle gear train (e.g., sun gear 124 and planet gears 208) are of the toothed mechanical gear set type commonly known as spur gears.

In some embodiments, the gearing of the rotating clusters 200 of eccentric bodies 202 (e.g., gears 206 and 208) and/or throttle gear train (e.g., sun gear 124 and planet gears 208) are of the toothed mechanical gear set type commonly known as helical gears.

In some embodiments, the gearing of the rotating clusters 200 of eccentric bodies 202 (e.g., gears 206 and 208) and/or throttle gear train (e.g., sun gear 124 and planet gears 208) are of the toothed mechanical gear set type termed conically tapered helically pitched gears.

Specific Embodiment: Reduced Set of Rotating Clusters

Figure 9:
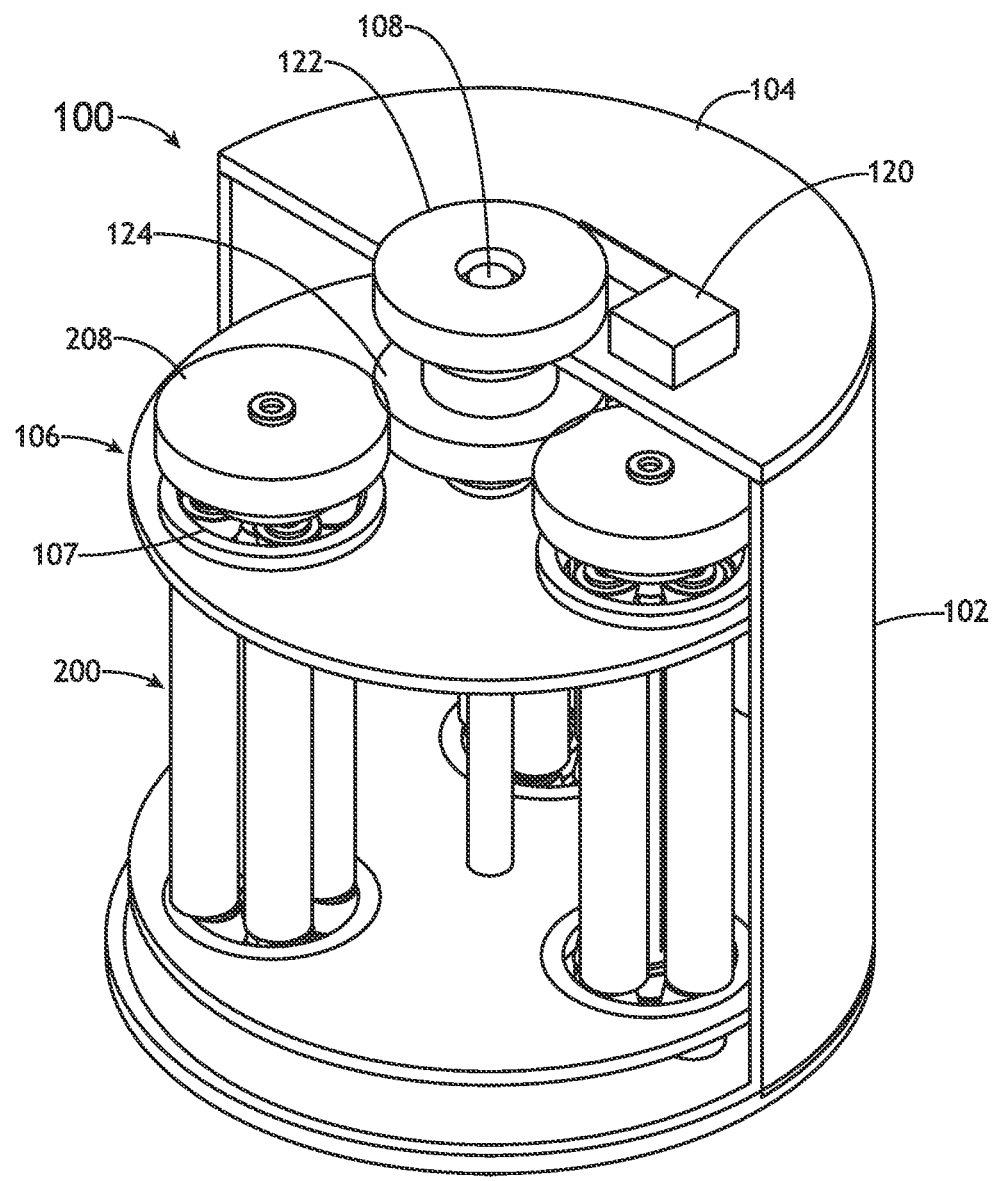
FIG. 9 is a perspective view of a heterodyne transmission with a reduced set of rotating clusters of eccentric bodies, wherein a portion of the outer casing is not shown, in accordance with one or more embodiments of this disclosure.
Figure 10:
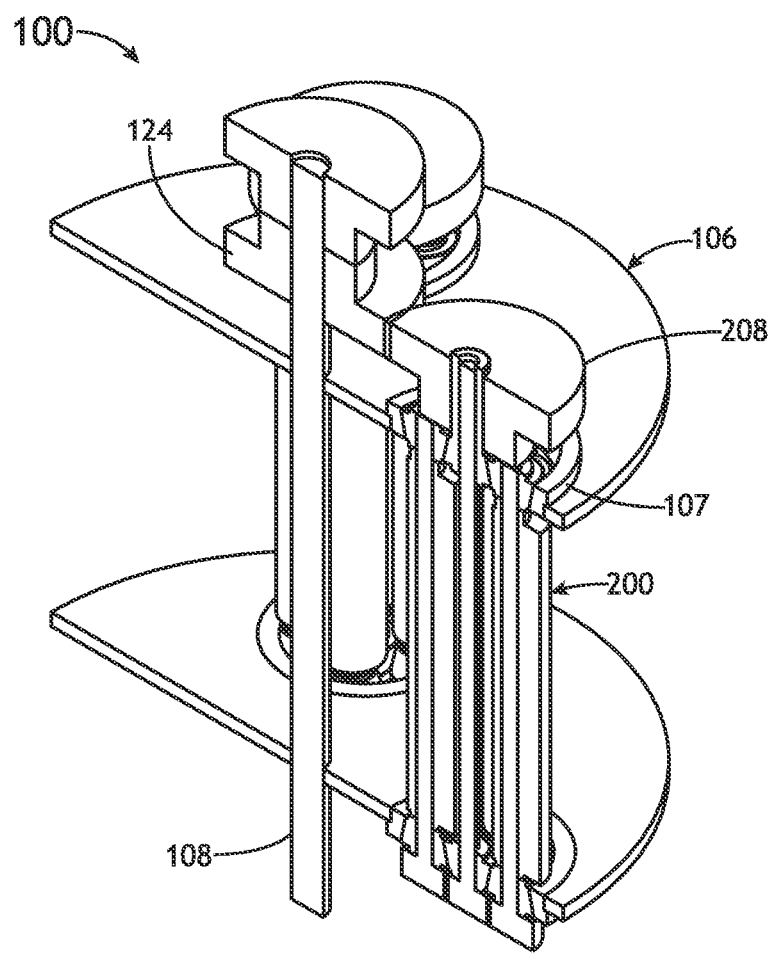
FIG. 10 is a cross-sectional perspective view of the heterodyne transmission illustrated in FIG. 9, wherein the outer casing is not shown, in accordance with one or more embodiments of this disclosure.

Referring now to FIGS. 9 and 10, in some embodiments, the rotary machine 100 may be constructed with three rotating clusters 200 distributed evenly about the periphery of the central rotor 106. While it is technically possible that the rotary machine 100 can be configured with a single eccentric cluster 200, the machine would vibrate badly. Two clusters 200 opposite one another can achieve dynamic balance but preferably at least three clusters 200 of eccentrics 202 are wanted in order to achieve a dynamically balanced result. Generally, the dynamic balance of the machine 100 and the respective clusters 200, and the eccentric bodies 202 within each cluster 200 is important and care should be taken that all masses, eccentric offsets and cluster positions be well made and balanced.

Specific Embodiment: Rollers

FIGS. 9 and 10 also illustrate an alternative embodiment of the rotating clusters 200 of eccentric bodies wherein the eccentric bodies 202 are equipped with eccentric rollers 206 and the central body 204 also includes a roller 205 that is intermeshed with the capstan rollers 206 of the eccentric bodies 202, and wherein the central body (sun/solar) roller 205 is coupled to a gear 208 that acts as a planet gear intermeshing with the sun gear 124 of the greater system.

Figure 11A:
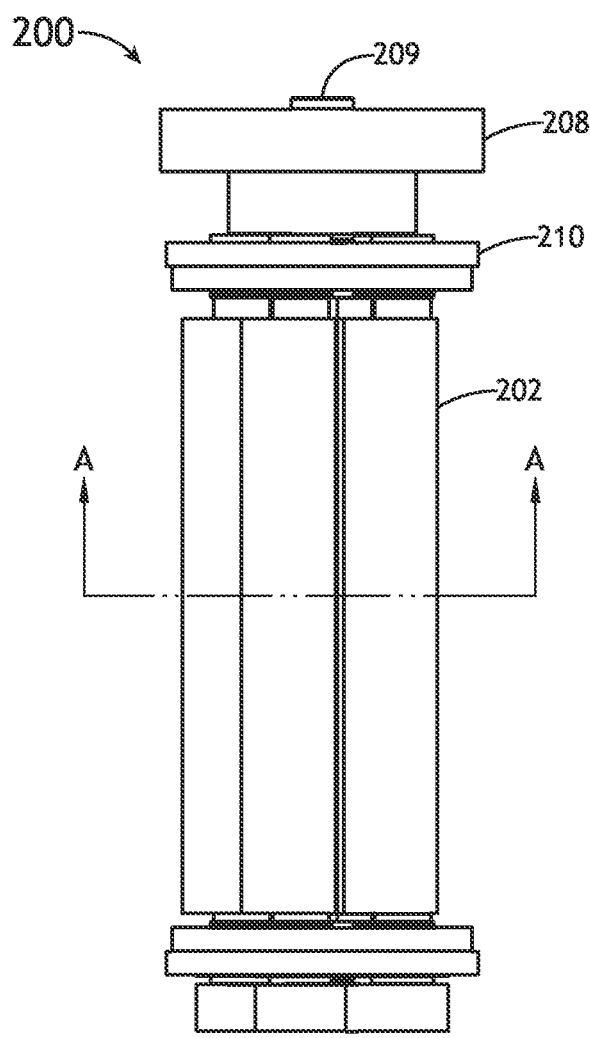
FIG. 11A is a side view of a rotating cluster of eccentric bodies, in accordance with one or more embodiments of this disclosure.
Figure 11B:
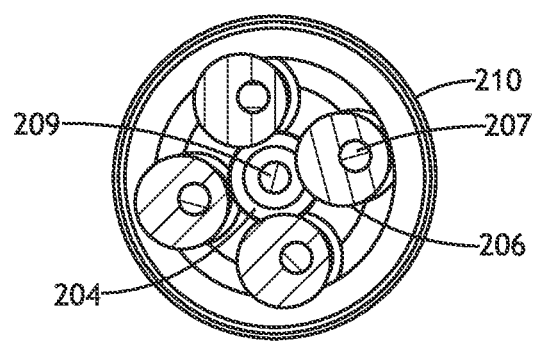
FIG. 11B is a cross-sectional view of the rotating cluster of eccentric bodies illustrated in FIG. 11A, in accordance with one or more embodiments of this disclosure.

As shown in FIGS. 11A and 11B, the bearing means of the rotating clusters 200 of eccentric bodies 202 may be comprised of a cluster ring 210 (e.g., a smooth ring or bearing race), eccentric rollers 206 and sun roller 205. The rollers may be substantially straight and true cylinders in form, tapered in their cylindrical form, conical, or substantially barrel shaped in their cylindrical form.

Specific Embodiment: Split Eccentric Bodies

Figure 12:
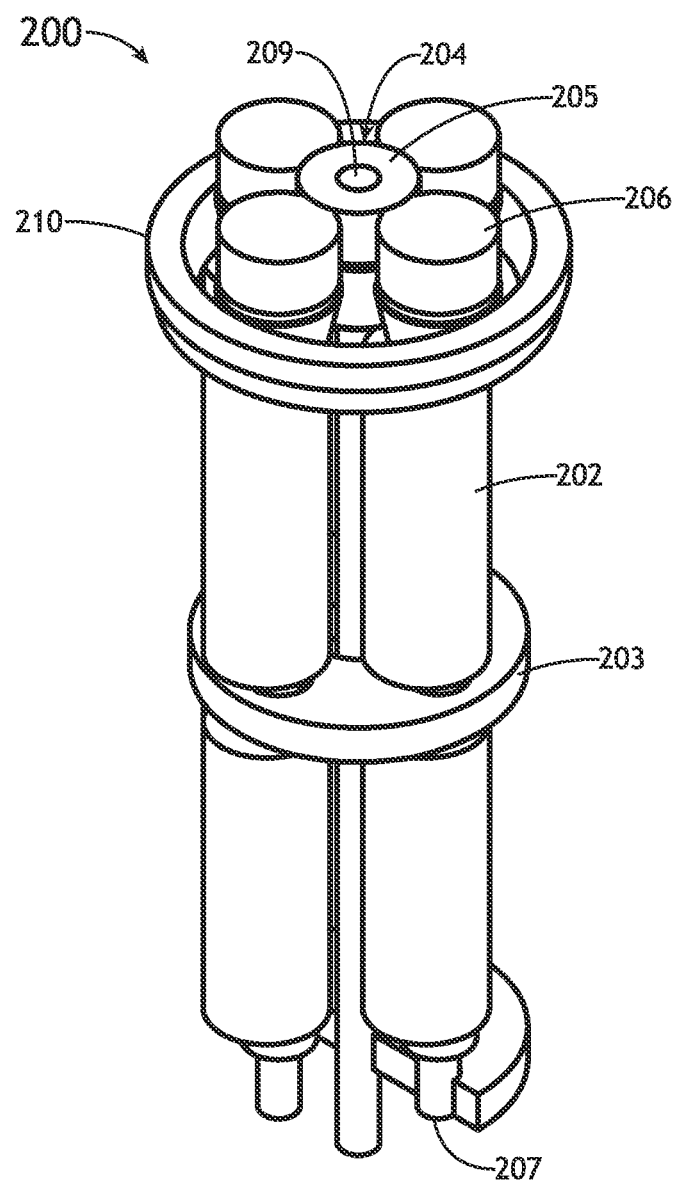
FIG. 12 is a perspective view of a rotating cluster of eccentric bodies, wherein the eccentric bodies are split into two body portions with a gap in between, and wherein respective axles of the eccentric bodies are extended through respective holes within a plate located at the gap between the split eccentric bodies, in accordance with one or more embodiments of this disclosure.
Figure 13B:
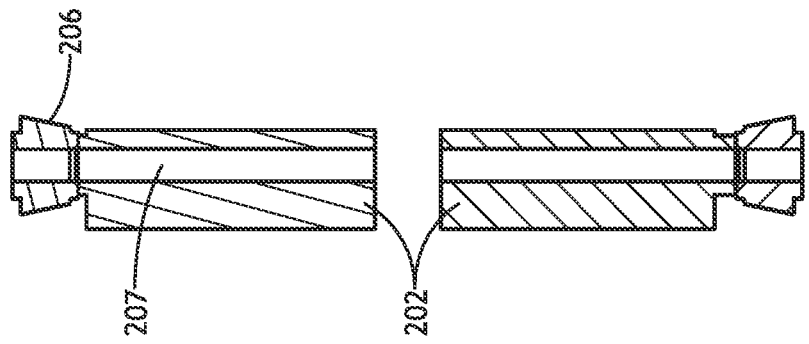
FIG. 13B is a cross-sectional side view of a rotating eccentric body from the rotating cluster of eccentric bodies illustrated in FIG. 12, in accordance with one or more embodiments of this disclosure.
Figure 13A:
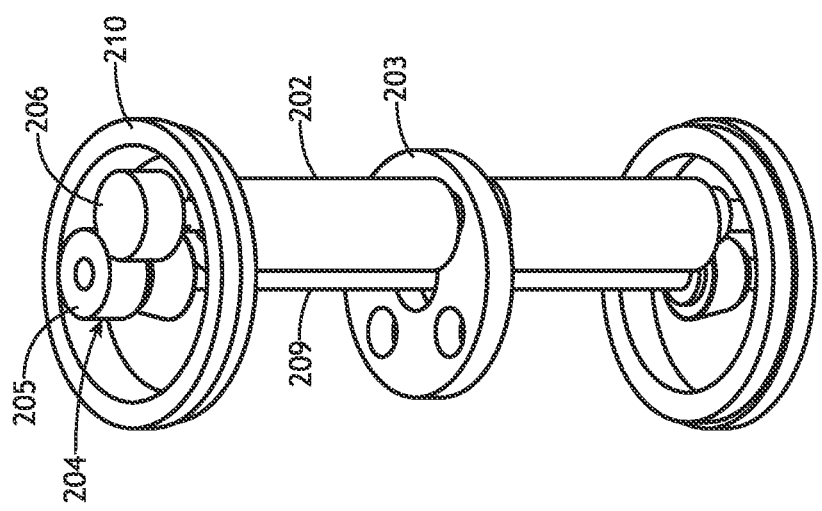
FIG. 13A is a perspective view of a rotating eccentric body orbiting a rotating central body from the rotating cluster of eccentric bodies illustrated in FIG. 12, in accordance with one or more embodiments of this disclosure.
Figure 14:
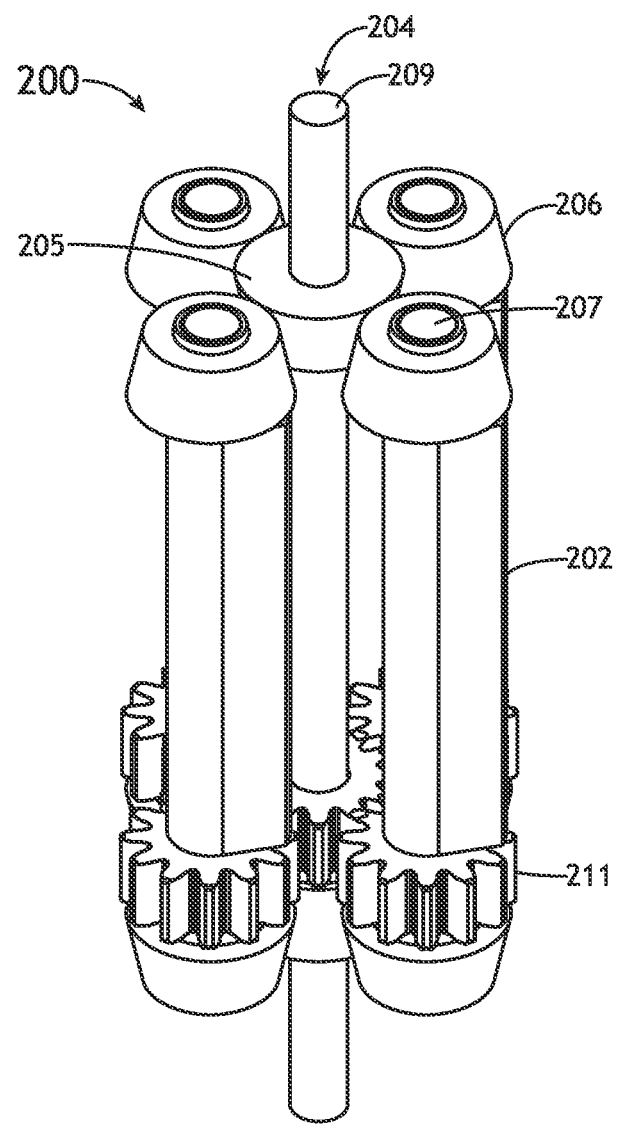
FIG. 14 is a perspective view of a rotating cluster of eccentric bodies, wherein the eccentric bodies have capstan rollers at one end and gears at another end, in accordance with one or more embodiments of this disclosure.

FIGS. 12, 13A, and 13B illustrate another embodiment of the rotating clusters 200 of eccentric bodies wherein each of the eccentric bodies 202 is split into a first body portion and a second body portion, wherein the first and second body portions are separated by a circular plate 203 that journals the axles/shafts 207 of all of the eccentric bodies 202 in a given cluster 200 of eccentric bodies 202. This configuration allows for the use of capstan rollers. Alternatively, a metal cage may be employed to separate the eccentric bodies 202 from one another in the absence of gearing to keep the eccentric bodies 202 from knocking into one another as they rotate about the central body 204.

Specific Embodiment: Rollers and Gears

In some embodiments, the rotating clusters 200 of eccentric bodies 202 may have a combination of rollers and gears. For example, the embodiment illustrated in FIG. 14 includes eccentric rollers 206 in addition to pinion gears 211. In some embodiments, the eccentric rollers 206 may be part of the bearing means while the gears 211 are part of the throttling means.

Specific Embodiment: Capstan

Another embodiment of the herein disclosed art is substantially comprised of any of the herein specified embodiments wherein the throttle gear train and/or the gearing of the group of eccentric bodies, engage with capstan mesh only, having no mechanically meshing teeth. In such embodiments, each cluster 200 may further include a metal cage with metal sheets that separate the eccentric bodies 202 from one another.

Although the technology has been described with reference to the embodiments illustrated in the attached drawing figures, equivalents may be employed, and substitutions may be made herein without departing from the scope of the technology as recited in the claims. Components illustrated and described herein are examples of devices and components that may be used to implement the embodiments of the present invention and may be replaced with other devices and components without departing from the scope of the invention. Furthermore, any dimensions, degrees, and/or numerical ranges provided herein are to be understood as non-limiting examples unless otherwise specified in the claims.

What is claimed is:

1. A rotary machine comprising:
    a central axle;
    a planetary gear set comprising a sun gear journaling the central axle and a plurality of planet gears surrounding and intermeshed with the sun gear; and
    a plurality of rotating clusters, each of the rotating clusters comprising a rotating central body and a plurality of rotating eccentric bodies surrounding and intermeshed with the rotating central body, wherein the rotating central body is coupled to a respective one of the planet gears, and wherein each of the rotating eccentric bodies has a center of mass off-axis with respect to its axis of rotation.

2. The rotary machine of claim 1, further comprising a rotor assembly that includes a set of circular plates connected by the central axle, each of the circular plates having a plurality of circular openings for respective ones of the plurality of rotating clusters to rotate within.

3. The rotary machine of claim 1, further comprising:
    a pair of end plates, wherein each end plate is coupled to an end of the central axle.

4. The rotary machine of claim 1, wherein the sun gear and the planet gears are toothed gears.

5. The rotary machine of claim 1, wherein the rotating eccentric bodies include gearing comprised of spur type gears.

6. The rotary machine of claim 1, wherein the rotating eccentric bodies include gearing comprised of capstan rollers having a cylindrical, barrel shaped, tapered cylinder, or conical exterior surface.

7. The rotary machine of claim 1, wherein the rotating eccentric bodies include gearing comprised of helically pitched gears.

8. The rotary machine of claim 1, further comprising:
    a throttle gearing ratably coupling an external actuator to the rotating eccentric bodies so that the external actuator can ratably adjust the orientation of eccentricity of the rotating eccentric bodies with respect to centrifugal force generated by rotation of the machine, force of gravity, or another external force.

9. The rotary machine of claim 8, wherein a gear train of the throttle gearing is comprised of a pulley coupled to the sun gear and a serpentine belt meshing with the pulley.

10. The rotary machine of claim 1, wherein each of the rotating clusters further comprises a cluster ring surrounding the plurality of rotating eccentric bodies.

11. The rotary machine of claim 10, wherein the cluster ring comprises a ring gear intermeshed with gearing of the eccentric bodies.

12. The rotary machine of claim 10, wherein the cluster ring comprises a smooth ring.

13. The rotary machine of claim 1, wherein each of the rotating eccentric bodies includes a rotary axle that is journaled by a ring embedded with a plurality of roller bearings or bushings.

14. The rotary machine of claim 1, wherein the central axle comprises an inner shaft nested within an outer shaft.

15. The rotary machine of claim 14, wherein the inner shaft and the outer shaft are concentric and configured to turn in opposite directions.

16. The rotary machine of claim 1, wherein each of the plurality of eccentric bodies is split into a first body portion and a second body portion rotating about a shaft, wherein the first and second body portions are separated by a circular plate that journals the shafts of all of the eccentric bodies in a cluster of eccentric bodies.

17. The rotary machine of claim 1, further comprising a metal cage configured to separate the plurality of rotating eccentric bodies from one another, wherein the eccentric bodies are equipped with capstan rollers.

18. The rotary machine of claim 1, wherein the rotating eccentric bodies are magnetized or formed from magnetic components.

19. The rotary machine of claim 18, further comprising a set of electromagnetic throttling field coils.

20. The rotary machine of claim 1, wherein the sun gear is fixedly or ratably coupled to a housing end plate but does not journal the central axle, the central axle being journaled by at least one bearing or bushing coupled to the housing end plate.

* * * * *